US012112734B2

(12) United States Patent
Butts

(10) Patent No.: US 12,112,734 B2
(45) Date of Patent: Oct. 8, 2024

(54) OPEN ACTIVE NOISE CANCELLATION SYSTEM

(71) Applicant: HARMAN INTERNATIONAL INDUSTRIES, INCORPORATED, Stamford, CT (US)

(72) Inventor: Donald Joseph Butts, Westport, CT (US)

(73) Assignee: Harman International Industries, Incorporated, Stamford, CT (US)

( * ) Notice: Subject to any disclaimer, the term of this patent is extended or adjusted under 35 U.S.C. 154(b) by 89 days.

(21) Appl. No.: 17/607,002

(22) PCT Filed: May 1, 2019

(86) PCT No.: PCT/US2019/030276
§ 371 (c)(1),
(2) Date: Oct. 27, 2021

(87) PCT Pub. No.: WO2020/222844
PCT Pub. Date: Nov. 5, 2020

(65) Prior Publication Data
US 2022/0208165 A1 Jun. 30, 2022

(51) Int. Cl.
*G10K 11/178* (2006.01)
*G10L 21/0216* (2013.01)

(52) U.S. Cl.
CPC .. *G10K 11/17821* (2018.01); *G10K 11/17873* (2018.01); *G10L 21/0216* (2013.01);
(Continued)

(58) Field of Classification Search
CPC ....... G10K 11/17821; G10K 11/17873; G10K 2210/3038; G10L 21/0216; G10L 2021/02161
(Continued)

(56) References Cited

U.S. PATENT DOCUMENTS 9,111,522 B1 8/2015 Worley, III
10,937,439 B2 * 3/2021 Cheung .............. G10L 21/0208
(Continued)

FOREIGN PATENT DOCUMENTS

KR 10-1965530 B1 4/2019
WO 2012/169095 A1 12/2012

OTHER PUBLICATIONS

International Search Report and Written Opinion, United States Patent and Trademark Office, dated Jul. 22, 2019, 8 pages.

*Primary Examiner* — Vivian C Chin
*Assistant Examiner* — Douglas J Suthers
(74) *Attorney, Agent, or Firm* — Artegis Law Group, LLP

(57) ABSTRACT

Embodiments of the present disclosure set forth a method of reducing noise in an audio signal. The method includes determining, based on sensor data acquired from a first set of sensors, a first position of a user in an environment. The method also includes acquiring, via the first set of sensors, one or more audio signals associated with sound in the environment and identifying one or more noise elements in the one or more audio signals. The method also includes generating a first directional audio signal based on the one or more noise elements. When the first directional audio signal is outputted by a first speaker, the first speaker produces a first acoustic field that attenuates the one or more noise elements at the first position.

20 Claims, 6 Drawing Sheets

(52) U.S. Cl.
CPC ................ *G10K 2210/3038* (2013.01); *G10L 2021/02161* (2013.01)

(58) Field of Classification Search
USPC ......................................................... 381/71.1
See application file for complete search history.

(56) References Cited

U.S. PATENT DOCUMENTS

| | | | | |
|---|---|---|---|---|
| 2007/0036367 | A1* | 2/2007 | Ko | G10K 11/17885 381/71.1 |
| 2011/0161074 | A1 | 6/2011 | Pance et al. | |
| 2016/0118036 | A1 | 4/2016 | Cheatham, III et al. | |
| 2016/0163304 | A1* | 6/2016 | Lee | G10K 11/17881 381/71.4 |
| 2017/0193975 | A1* | 7/2017 | Butts | G10K 11/17854 |
| 2018/0033454 | A1 | 2/2018 | Hardek | |
| 2018/0376243 | A1 | 12/2018 | Nagel et al. | |
| 2019/0035381 | A1 | 1/2019 | Maziewski et al. | |

* cited by examiner

OPEN ACTIVE NOISE CANCELLATION SYSTEM

CROSS-REFERENCE TO RELATED APPLICATIONS

The present application is a national stage application of the international application titled, "OPEN ACTIVE NOISE CANCELLATION SYSTEM," filed on May 1, 2019 and having application number PCT/US2019/030276. The subject matter of this related application is hereby incorporated herein by reference.

BACKGROUND

Field of the Various Embodiments

Embodiments of the present disclosure relate generally to audio systems and, more specifically, to an open active noise cancellation system.

Description of the Related Art

Many corporate offices employ open-office environments, where multiple workers work in a common space, instead of workers being separated via physical barriers, such as full walls (which provide separate rooms) or cubicle walls (which provide separate areas within a common room). Because workers share a common space, the open-office environment encourages in-person communication and collaboration between workers.

One of the drawbacks of open-office environments, however, is that the common space forces workers to function in noisy environments that afford little privacy. For example, when conducting calls with others, the worker is forced to speak and listen within the noisy open-office environment, where noise from the environment hinders the user's ability to hear the speaker. The noisy environment also hinders the user's ability to speak clearly over other noise sources. Alternatively, the worker is forced to move to a quieter environment that does not have the noise elements. However, such spaces may be limited.

As the foregoing illustrates, improved systems for voice communications within an open office environment would be useful.

SUMMARY

Embodiments of the present disclosure set forth a method of reducing noise in an audio signal. The method includes determining, based on sensor data acquired from a first set of sensors, a first position of a user in an environment. The method also includes acquiring, via the first set of sensors, one or more audio signals associated with sound in the environment and identifying one or more noise elements in the one or more audio signals. The method also includes generating a first directional audio signal based on the one or more noise elements. When the first directional audio signal is outputted by a first speaker, the first speaker produces a first acoustic field that attenuates the one or more noise elements at the first position.

Further embodiments provide, among other things, a system and computer-readable storage medium for implementing aspects of the methods set forth above.

At least one technological advantage of the disclosed techniques is that audio signals can be transmitted to a user while also canceling certain noises within an open environment. The open active noise cancellation system identifies and then attenuates or cancels certain noise elements, which enables the user to both speak and/or listen to speech within an open environment without requiring extra equipment, such as barriers or headphones, to suppress noise when communicating.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
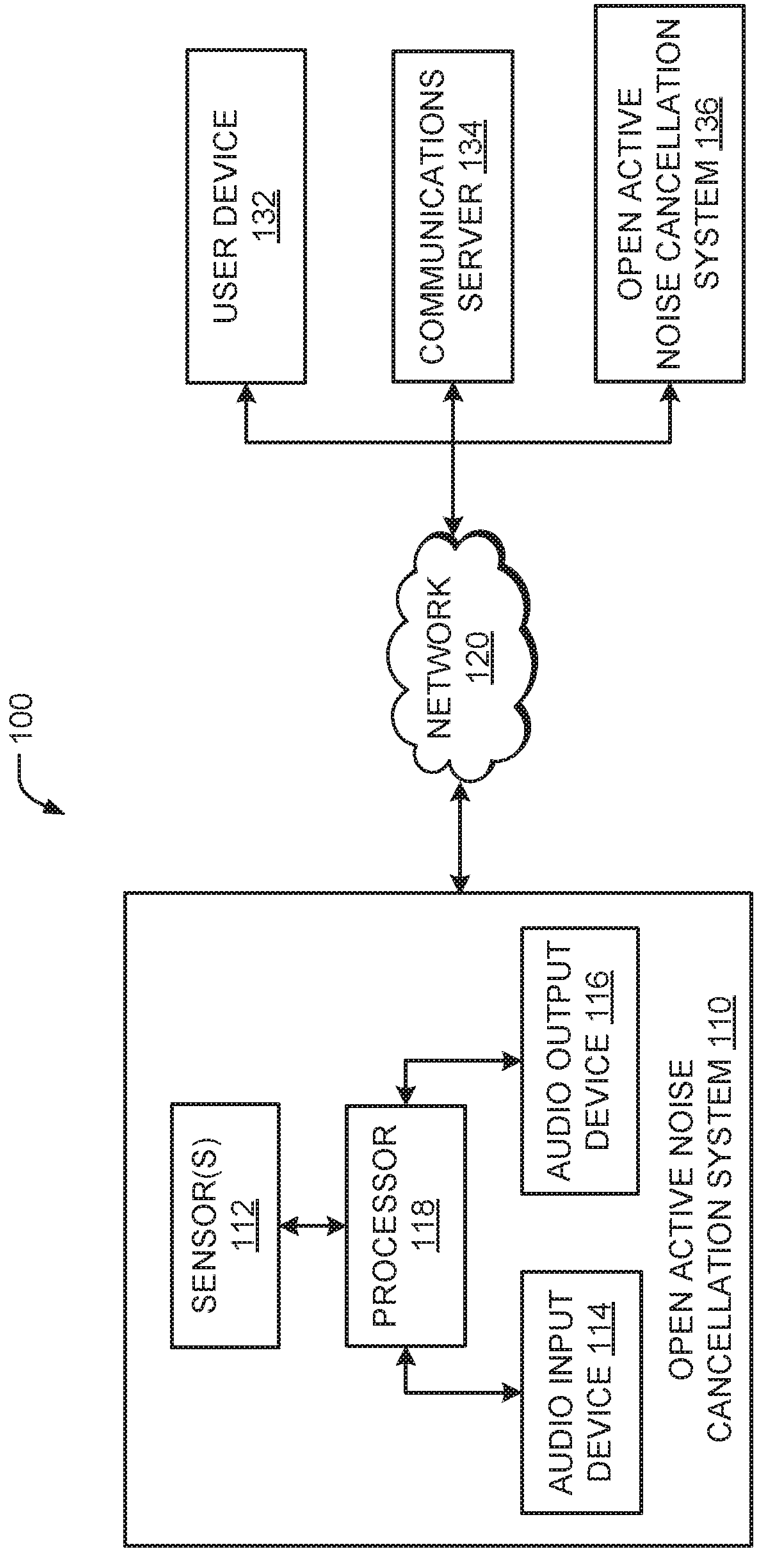
FIG. 1 illustrates a block diagram of a computer network that includes an open active noise cancellation system configured to implement one or more aspects of the present disclosure.

FIG. 1 illustrates a block diagram of a computer network 100 that includes an open active noise cancellation system 110 configured to implement one or more aspects of the present disclosure. As shown, computer network 100 includes, without limitation, open active noise cancellation system 110, network 120, user device 132, communications server 134, and/or open active noise cancellation system 136. In alternative embodiments, computer network 100 may include any number of user devices 132, open active noise cancellation system 110, 136, and/or communications servers 134.

Open active noise cancellation system 110 includes one or more sensors 112, audio input device 114, audio output device 116, and/or speech processor 118. In various embodiments, open active noise cancellation system 110 can include a desktop computer, laptop computer, mobile computer, or any other type computing system that is suitable for practicing one or more embodiments of the present disclosure and is configured to receive data as inputs, process the data, and emit sound. In various embodiments, open active noise cancellation system 136 may include one or more components included in open active noise cancellation system 110. As will be discussed in greater detail below, open active noise cancellation system 110 is configured to enable a user to communicate with one or more devices via network 120 via speech. In various embodiments, open active noise cancellation system 110 may execute one or more applications to capture the user's speech and transmit the speech to other devices via network 120. Additionally or alternatively, open active noise cancellation system 110 may execute the one or more applications to process audio signals received via network 120 and emit the audio signals via one or more audio output devices.

In various embodiments, in operation, open active noise cancellation system 110 captures audio signals via audio input device 114 and/or sensors 112. The captured audio signals may include a user's speech and one or more noise elements. Speech processor 118 included in open active noise cancellation system 110 filters the captured audio to attenuate and/or suppress the noise elements in the captured audio signal to produce a processed audio signal. Open active noise cancellation system 110 transmits the processed audio signal to one or more recipients via network 120. In various embodiments, the one or more recipients include one or more of user device 132, communications server 134, and/or a device having the same or similar functionality as open active noise cancellation system 136.

In various embodiments, open active noise cancellation system 110 may receive an audio input signal via network 120. In such instances, speech processor 118 included in open active noise cancellation system 110 may process the audio input signal. One or more sensors 112 may generate position data associated with the position of the user within an environment. One or more sensors 112 and/or audio input device 114 may also capture noise signals from one or more noise sources within the environment. Speech processor 118 may receive the position data and/or the noise signals and may produce a corresponding directional processed audio signal. In various embodiments, speech processor 118 may transmit the directional processed audio signal to audio output device 116. Audio output device 116 may generate an acoustic field that includes the position of the user within the environment. Audio output device 116 reproduces the processed audio signal within the generated acoustic field, which enables the user to hear the audio signal, while the various noise elements within the environment are attenuated within the acoustic field.

Network 120 includes a plurality of network communications systems, such as routers and switches, configured to facilitate data communication between open active noise cancellation systems 110, 136, user device 132, and/or communications server 134. Persons skilled in the art will recognize that many technically-feasible techniques exist for building network 120, including technologies practiced in deploying an Internet communications network. For example, network 120 may include a wide-area network (WAN), a local-area network (LAN), and/or a wireless (Wi-Fi) network, among others.

User device 132 can be a desktop computer, laptop computer, mobile computer, or any other type computing system that is configured to receive input, process data, emit sound, and is suitable for practicing one or more embodiments of the present disclosure. User device 132 is configured to enable a user to communicate with one or more devices via network 120 via speech. In various embodiments, user device 132 may execute one or more applications to capture the user's speech and transmit the speech to other devices via network 120. Additionally or alternatively, user device 132 may execute the one or more applications to process audio signals received via network 120 and emit the audio signals via one or more audio output devices.

Communications server 134 comprises a computer system configured to receive data and/or audio signals from one or more user devices 132 and/or open active noise cancellation systems 110, 136. In various embodiments, communications server 134 executes an application in order to synchronize and/or coordinate the transmission of data between devices that are engaging in real-time communication.

Figure 2:
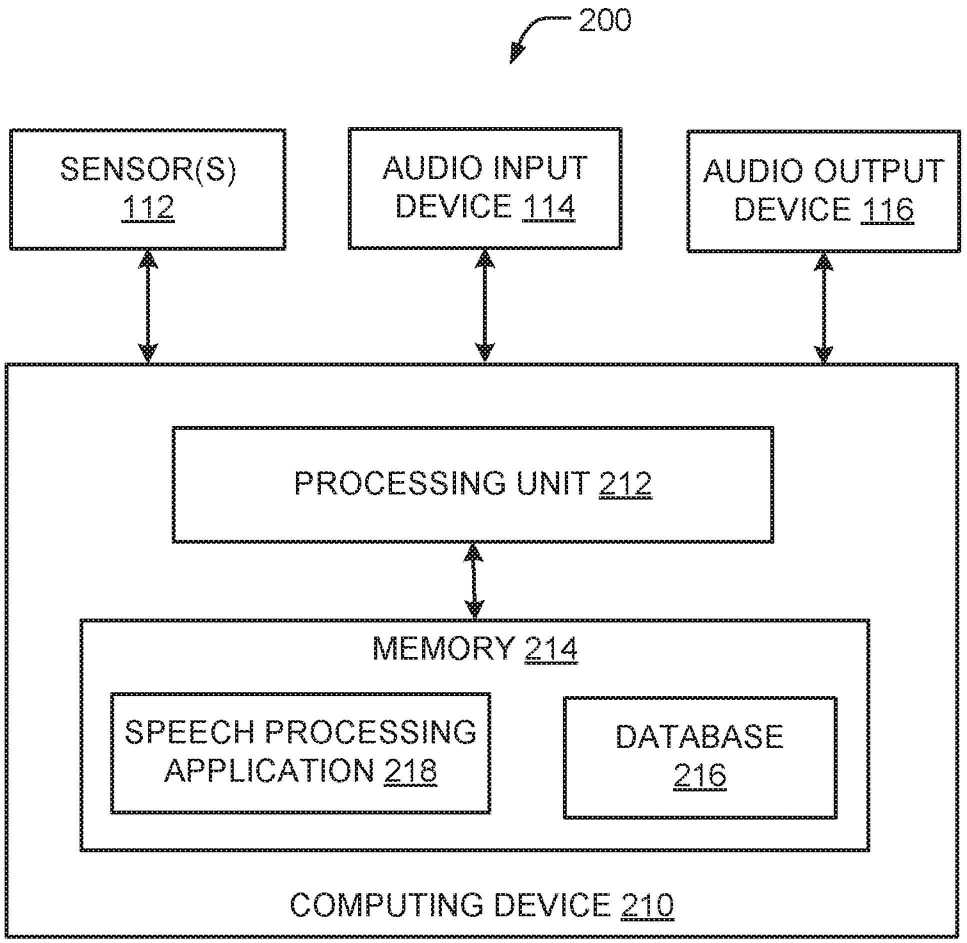
FIG. 2 illustrates a block diagram of an open active noise cancellation system of FIG. 1 configured to process voice signals and noise signals, according to various embodiments of the present disclosure.

FIG. 2 illustrates a block diagram of an open active noise cancellation system 110 of FIG. 1 configured to process voice signals and noise signals, according to various embodiments of the present disclosure. Open active noise cancellation system 200 includes one or more sensors 112, audio input device 114, audio output device 116, and computing device 210. Computing device 210 includes processing unit 212, and memory 214. Memory 214 stores database 216 and speech processing application 218.

In operation, processing unit 212 receives data from one or more sensors 112, audio input device 114, and/or network 120. In various embodiments, the received data includes audio signals (e.g., speech signals, noise signals, etc.) and/or sensor data. Processing unit 212 executes speech processing application 218 to analyze the sensor data and audio signals. Upon analyzing the audio signals and sensor data, speech processing application 218 generates a processed audio signal. The processed audio signal attenuates and/or suppresses noise elements associated with the audio signals. In various embodiments, speech processing application 218 may cause audio output device 116 to emit an acoustic field.

In various embodiments, speech processing application 218 can use various speech recognition and/or noise recognition techniques to identify portions of captured audio. Speech processing application 218 identifies one or more noise elements included in portions of the captured audio and filters the captured audio to attenuate and/or remove the identified noise elements. In some embodiments, speech processing application 218 may attenuate the noise elements when processing speech provided by a user before generating a processed audio signal to be sent to recipients via network 120. Additionally or alternatively, speech processing application 218 may identify noise elements in an environment and generate a directional processed audio signal that suppresses noise when generating an acoustic field for the user.

One or more sensors 112 include one or more devices that collect data associated with objects in an environment. In various embodiments, one or more sensors 112 may include groups of sensors that acquire different sensor data. For example, the one or more sensors 112 could include a reference sensor, such as a microphone and/or accelerometer, which could acquire sound data and/or motion data (e.g., acceleration, velocity, etc.). In another example, the one or more sensors 112 could include one or more position trackers, such as one or more cameras, thermal imagers, linear position sensors, etc., which could acquire data corresponding to the position of the user.

In various embodiments, produce sensor data by performing measurements and/or collecting other data. For example, one or more sensors 112 may produce sensor data that is associated with the position of a user within an environment. One or more sensors 112 may perform measurements, such as distance measurements, and produce sensor data that reflects the distance measurements (e.g., position data). Computing device 210 may analyze the sensor data received from the one or more sensors 112 in order to track the location of the user. In various embodiments, speech processing application 218 may then determine a target location within the environment at which an acoustic field will be generated by audio output device 116.

In various embodiments, the one or sensors 112 may include position sensors, such as an accelerometer or an inertial measurement unit (IMU). The IMU may be a device like a three-axis accelerometer, gyroscopic sensor, and/or magnetometer. In some embodiments, the one or sensors 112 may include optical sensors, such RGB cameras, time-of-flight sensors, infrared (IR) cameras, depth cameras, and/or a quick response (QR) code tracking system. In addition, in some embodiments, the one or sensors 112 may include wireless sensors, including radio frequency (RF) sensors (e.g., sonar and radar), ultrasound-based sensors, capacitive sensors, laser-based sensors, and/or wireless communications protocols, including Bluetooth, Bluetooth low energy (BLE), wireless local area network (WiFi) cellular protocols, and/or near-field communications (NFC).

As noted above, computing device 210 may include processing unit 212 and memory 214. Computing device 210 may be a device that includes one or more processing units 212, such as a system-on-a-chip (SoC), or a mobile computing device, such as a tablet computer, mobile phone, media player, and so forth. Generally, computing device 210 may be configured to coordinate the overall operation of open active noise cancellation system 200. In some embodiments, computing device 210 may be coupled to, but be separate from, the one or more sensors 112, audio input device 114, and/or audio output device 116. In such instances, computing device 210 may be included in a separate device. The embodiments disclosed herein contemplate any technically-feasible system configured to implement the functionality of open active noise cancellation system 200 via computing device 210.

Processing unit 212 may include a central processing unit (CPU), a digital signal processing unit (DSP), a microprocessor, an application-specific integrated circuit (ASIC), a neural processing unit (NPU), a graphics processing unit (GPU), a field-programmable gate array (FPGA), and so forth. In some embodiments, processing unit 212 may be configured to execute speech processing application 218 in order to analyze captured audio signals, received audio signals, and/or sensor data and identify noise elements included in an environment. In some embodiments, processing unit 212 may be configured to execute speech processing application 218 to identify one or more noise elements and generate processed audio signals where the noise elements are attenuated and/or removed.

Memory 214 may include a memory module or collection of memory modules. Speech processing application 218 within memory 214 may be executed by processing unit 212 to implement the overall functionality of the computing device 210 and, thus, to coordinate the operation of the open active noise cancellation system 200 as a whole.

Database 216 may store values and other data retrieved by processing unit 212 to coordinate the operation of open active noise cancellation system 200. In various embodiments, in operation, processing unit 212 may be configured to store values in database 216 and/or retrieve values stored in database 216. For example, database 216 may store sensor data, audio content, and reference audio (e.g., one or more reference noise signals) digital signal processing algorithms, transducer parameter data, and so forth.

Audio input device 114 may be a device capable of receiving one or more audio inputs. Audio input device 114 may be as a microphone. Audio output device 116 may be a device capable of providing one or more audio outputs. Audio output device 116 may be a speaker system (e.g., one or more loudspeakers, amplifier, etc.) or other device that generates an acoustic field. For example, audio output device 116 could be a speaker array that includes a plurality of parametric speakers that generate an acoustic field around a specified location. In various embodiments one or more of audio input device 114 and/or audio output device 116 can be incorporated into computing device 210, or may be external to computing device 210.

Figure 3:
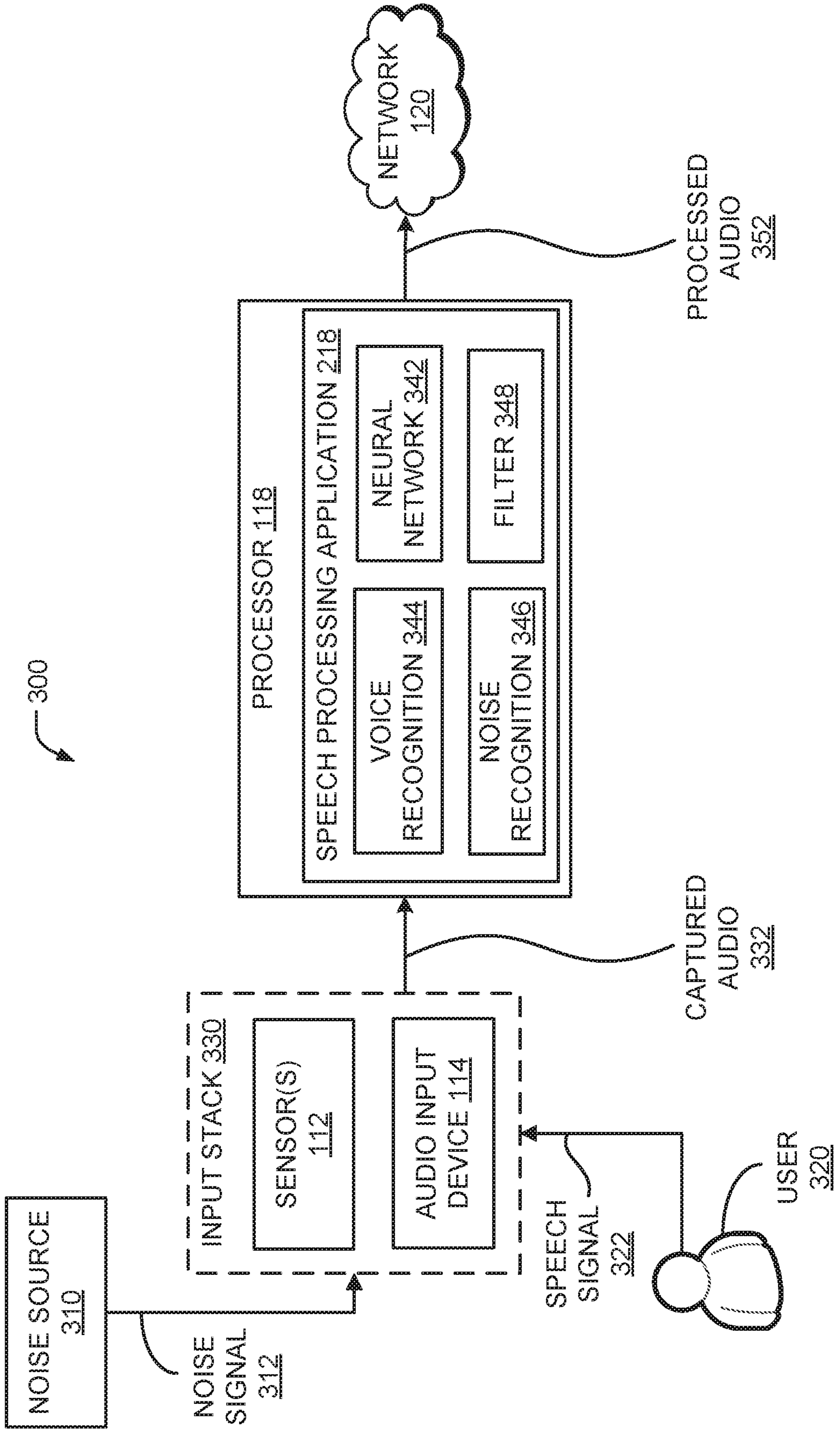
FIG. 3 illustrates a technique for processing audio signals to attenuate noise elements associated with a captured speech signal using the open active noise cancellation system of FIG. 1, according to various embodiments of the present disclosure.

FIG. 3 illustrates a technique for processing audio signals to attenuate noise elements associated with a captured speech signal using the open active noise cancellation system of FIG. 1, according to various embodiments of the present disclosure. As shown, open active noise cancellation system 300 includes input stack 330 and processor 118. Input stack 330 includes one or more sensors 112 and audio input device 114. Processor 118 includes speech processing application 218, which includes voice recognition application 344, noise recognition application 346, neural network 342, and filter 348. In various embodiments, speech processing application 218—including one or more of voice recognition application 344, noise recognition application 346, neural network 342, and filter 348—may be stored in memory 214 and executed by processor 118.

In operation, one or more components included in input stack 330 acquire signals from sources in an ambient environment. For example, input stack 330 could acquire speech made by user 320 and noise made by one or more noise sources 310. Processor 118 receives the signals acquired from input stack 330 as captured audio signal 332. Processor 118 executes speech processing application 218 to analyze captured audio signal 332 and produce processed audio signal 352 that is based on the analysis. Processed audio signal 352 is an electronic or digital signal that is used for audio rendering by one or more devices (e.g., audio output device 116). Processor 118 may then transmit processed audio signal 352 to one or more recipients that reproduce processed audio signal.

In various embodiments, the one or more sensors 112 and/or audio input device 114 may include microphones that capture one or more physical audio signals. Input stack 330 produces an electronic or digital signal as captured audio signal 332. For example, input stack 330 could acquire one or more noise signals 312 from one or more noise sources 310 in the ambient environment. Additionally or alternatively, input stack 330 could acquire one or more speech signals 322 from one or more users 320 within the ambient environment. In some embodiments, input stack 330 may receive noise signal 312 and speech signal 322 within the same time period. In such instances, portions of captured audio signal 332 include both noise signal 312 and speech signal 332.

Processor 118 analyzes captured audio signal 332 received from input stack 330 and produces processed audio signal 352. In various embodiments, processor 118 executes speech processing application 218 to analyze captured audio signal 332. In some embodiments, neural network 342 included in speech processing application 218 analyzes captured audio signal 332 using one or more applications to identify certain elements included in captured audio signal 332. For example neural network 342 could use voice recognition application 344 to identify speech elements and/or individual speakers from one or more portions of captured audio signal 332. Additionally or alternatively, neural network 342 could also analyze captured audio signal 332 using noise recognition application 346 to identify noise elements that are included in one or more portions of captured audio signal 332.

Upon analyzing captured audio signal 332, speech processing application 218 applies one or more filters 348 to generate a signal based on captured audio signal 332, where the generated signal has certain portions emphasized or attenuated. In various embodiments, processor 118 generates processed audio signal 352 by applying one or more filters 348 to captured audio signal 332. In various embodiments, speech processing application 218 may modify one or more filters 348 based on identifying the noise elements and/or speech elements included in captured audio signal 332. Speech processing application 218 may then apply the modified filters 348 to captured audio signal 332 in order to produce processed audio signal. In such instances, portions of captured audio 332 may be attenuated in the corresponding portions of processed audio signal 352. Upon generating processed audio signal 352, in some embodiments, processor 118 may transmit processed audio signal 352 to one or more recipients via network 120.

Neural network 342 is an artificial intelligence (AI) computing system that employs one or more machine-learning (ML) techniques to analyze an input signal. For example, neural network 342 could employ voice recognition application 344, which uses one or more ML techniques to learn speech elements and/or characteristics of individual speakers. When neural network 342 stores learned speech elements and speaker characteristics, neural network 342 may identify speech elements in subsequently-received captured audio signals 332 based on these stored element and characteristics. For example, using previous knowledge, neural network 342 could employ voice recognition application 344 to analyze captured audio signal 332. In such instances, neural network could identify speech signal 322, individual speakers, speaker characteristics, and/or specific speech elements or that is included in portions of captured audio signal 332. In various embodiments, neural network 342 may identify the specific speech characteristics and speech elements by retrieving data (e.g., reference speech elements and/or reference speech signals) from database 216 and comparing the retrieved data to portions of captured speech signal 332. Suitable ML techniques or computing systems employed by neural network 342 when employing voice recognition application 344 could include, for example, a nearest-neighbor classifier procedure, Markov chains, deep learning methods, and/or any other technically-feasible approach.

Additionally or alternatively, neural network 342 may employ noise recognition application 346, which uses one or more ML techniques to learn individual noise sources and/or known noise characteristics (e.g., patterns, specific noise sources, etc.) within the ambient environment. Neural network 342 can similarly employ noise recognition application 346 to learn noise characteristics and subsequently identify specific noise elements, and/or individual speech signals 312 by comparing portions of captured audio signal 332 to reference data stored in database 216.

Filter 348 may include one or more filters that modify an audio signal before playback by an audio output device. In various embodiments, filter 348 may include a filter bank of two or more filters that individually adjust each of a number of frequency components (e.g., frequency ranges) of a received audio signal. For example, processor 118 could adjust filter 348 to attenuate noise elements and/or some voice elements identified by neural network 342. In such instances, filter 348 can receive captured audio signal 332 and can modify different frequency ranges of captured audio signal 332 in order to generate processed audio signal 352. In some embodiments, filter 348 may decompose captured audio signal 332 into a set of filtered signals, where each filtered signal corresponds to frequency sub-bands of captured audio signal 332. In such instances, filter 348 may attenuate one or more of the frequency sub-bands in order to attenuate identified noise elements and/or speech elements of captured audio signal 352.

Figure 4:
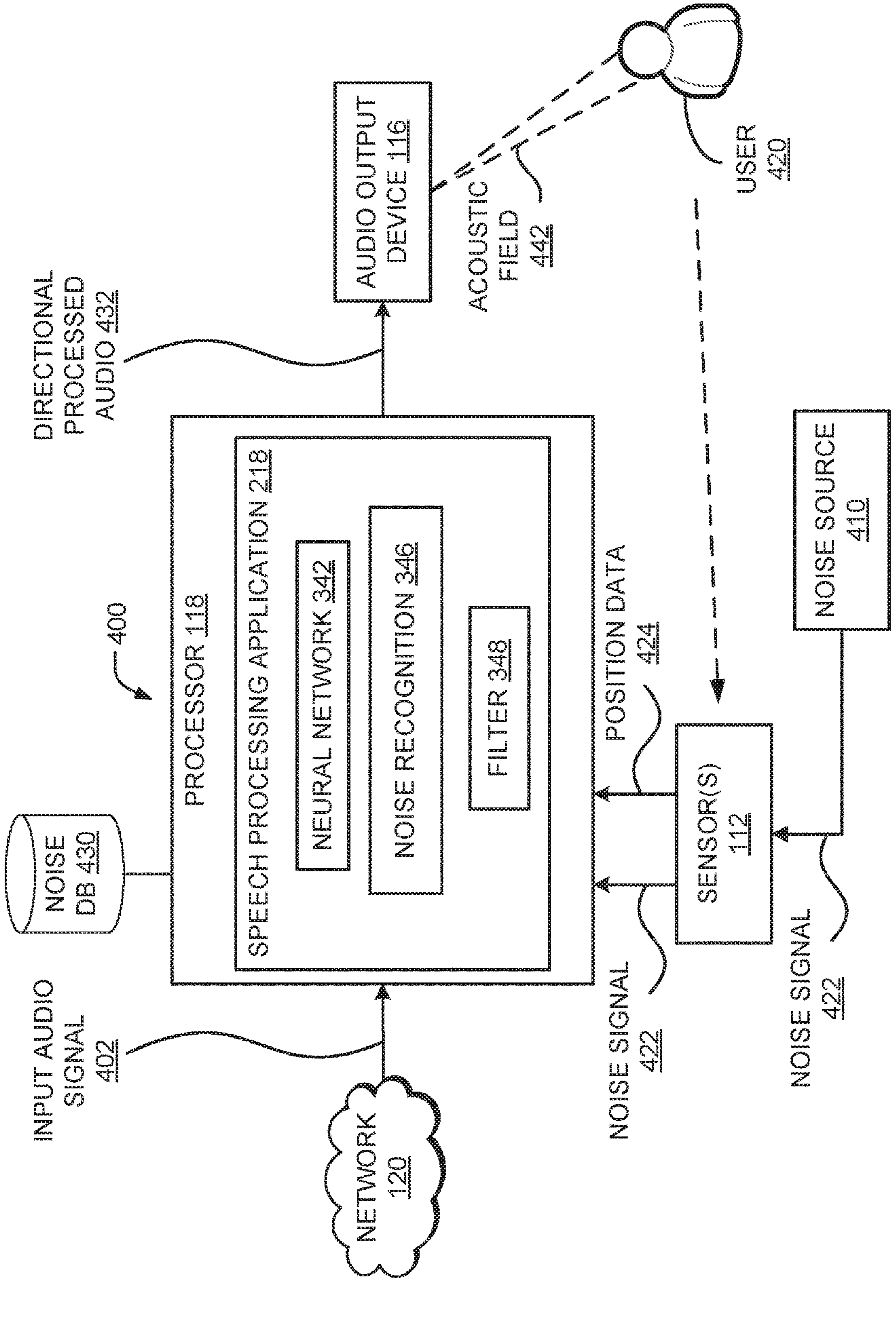
FIG. 4 illustrates a technique for processing audio signals to attenuate noise elements in order to emit a directional audio output signal using the open active noise cancellation system of FIG. 1, according to various embodiments of the present disclosure.

FIG. 4 illustrates a technique for processing audio signals to attenuate noise elements in order to emit a directional audio output signal using the open active noise cancellation system of FIG. 1, according to various embodiments of the present disclosure. As shown, open noise cancellation system 400 includes processor 118, one or more sensors 112, audio output device 116, noise source 410, user 420, and/or noise database (DB) 430. Processor 118 includes speech processing application 218, which includes neural network 342, noise recognition application 346, and filter 348. In various embodiments, speech processing application 218, including one or more of neural network 342, noise recognition application 346, and filter 348 may be stored in memory 214 and executed by processor 118.

In operation, processor 118 receives data from various sources, where the sources include one or more sensors 112 and one or more senders (via network 120). The received data includes audio data (e.g., input audio signal 402 and noise signal 422) and position data 424 that corresponds to the position of user 420 within the ambient environment. Processor 118 executes speech processing application 218 to analyze the received data and generate directional processed audio signal 432 that is based on the analysis. Directional processed audio signal 432 has components that correspond to input audio signal 402, components that attenuate noise signal 422, and directional components that correspond to emitting soundwaves towards the position of user 420. Processor 118 then transmits directional processed audio signal 432 to audio output device 116. Audio output device 116 outputs directional processed audio signal 432 by emitting soundwaves that produce acoustic field 442. The characteristics of acoustic field 442 enable user 420, who is located at the determined position within the ambient environment, to hear portions of directional processed audio signal 432 that correspond to input audio signal 402, while attenuating noise signals 422 that are within the ambient environment.

Input audio signal 402 is an analog or digital signal for output by audio output device 116. In various embodiments, input audio signal 402 may correspond to processed audio signal 352 provided by another device via network 120. Noise signal 422 is an analog or digital signal generated by one or more sensors 112 in response to the one or more sensors 112 receiving soundwaves from one or more noise sources 410. In various embodiments, processor 118 may receive noise signal 422 separately from input audio signal 402.

Speech processing application 218 analyzes noise signal 422 in order to identify one or more noise elements. In various embodiments, neural network 342 included in speech processing application 218 may employ noise recognition application 346 in order to identify one or more noise elements included in noise signal 422. In some embodiments, neural network 342 may employ noise recognition application to retrieve one or more reference signals from noise database 430 that correspond to specific noise elements (e.g., a cough, one or more loudspeakers, one or more individuals speaking, HVAC systems, computer interactions, etc.). For example, noise recognition application may compare a portion of noise signal 422 to a reference signal stored in noise database 430 in order to identify noise source 410. In such instances, speech processing application 218 may modify filter 348 to generate directional processed audio 432 such that acoustic field 442 attenuates the identified noise elements within the acoustic field.

In various embodiments, speech processing application 218 provides active noise control (ANC) by generating a noise cancellation signal based on the identified noise elements and/or noise signal 422. In such instances, speech processing application 218 generate the noise cancellation signal by applying one or more filters 348 on noise signal 422. Additionally or alternatively, speech processing application 218 may incorporate the noise cancellation signal into the characteristics of the directional processed audio signal 432. In such instances, audio output device 116 may emit a soundwave, where the soundwave includes an anti-noise portion that provides destructive interference with the identified noise elements. For example, speech processing application 218 could receive noise signal 422 from the one or more sensors 112. Speech processing application 218 may then generate a noise cancellation signal that causes audio output device 116 to emit a soundwave that includes an anti-noise component that has the same amplitude and is antiphase to noise signal 422. In some embodiments, speech processing application 218 may associate the generated anti-noise signal with the corresponding identified noise element and may store the anti-noise signal in database 216.

In various embodiments, in order to generate directional processed audio signal 432, speech processing application 218 determines the relative position of user to audio output device 116 and includes one or more directional parameters that cause audio output device 116 to produce acoustic field 442 that encompasses user 420 at the corresponding position. Processor transmits directional processed audio signal 432 to audio output device 116, which emits soundwaves corresponding to acoustic field 442.

Processor 118 receives position data 424 generated by one or more sensors 112. In various embodiments, position data 424 is sensor data relating to the position(s) and/or orientation(s) of one or more users 420 within the ambient environment. In some embodiments, position data 424 also includes the position(s) and/or orientation(s) of one or more speakers included in audio output device 116. In such instances, processor 118 may execute speech processing application 218 to generate position parameters, such as direction and distance, based on the relative position of user 420 to audio output device 116. In various embodiments, position data 424 may include data relating to the position and/or orientation of user 420 within the ambient environment during a specified time period. For example, during a first specified time period of $t_0$-$t_1$, user 420 has an initial position. In this example, one or more sensors 112 could acquire position data 424 corresponding to the first position for the first specified period. When user 420 moves to a second position during a second specified time period of $t_1$-$t_2$, the one or more sensors 112 could acquire position data corresponding to the second position for the second specified time period.

In various embodiments, speech processing application 218 generates directional processed audio signal 432 to include one or more parameters associated with audio output device 116 emitting soundwaves to produce acoustic field 442. In such instances, the parameters specify how audio output device 116 emits soundwaves such that the corresponding acoustic field 442 encompasses the position of user 420. Speech processing application 218 produces the one or more parameters based on position data 424 received from the one or more sensors 112 and includes the parameters in directional processed audio signal 432. In various embodiments, directional processed audio signal 432 may include, without limitation, a direction in which a target is positioned relative to audio output device 116 (e.g., relative to a center axis of a loudspeaker included in audio output device 116), a sound level to be outputted by audio output device 116 in order to generate a desired sound level at the target position (e.g., a target position that is off-axis relative to the loudspeaker), a distance between audio output device 116 and the target position, a distance and/or angle between audio output device 116 and the target position, etc.

Audio output device 116 receives directional processed audio signal 432 provided by speech processing application 218. In various embodiments, audio output device 116 outputs directional processed audio signal 432 by emitting soundwaves in order to generate acoustic field 442. Acoustic field 442 is associated with data that is included in directional processed audio signal 432. The soundwaves that are emitted by audio output device 116 reproduce input audio signal 402. The soundwaves of acoustic field 442 have characteristics that attenuate (e.g., cancel out via destructive interference) other noise signals 422 also included in the environment. As a result, when user 420 is within acoustic field 442, the user can hear input audio signal 402 without interference from one or more noise signals 422.

Figure 5:
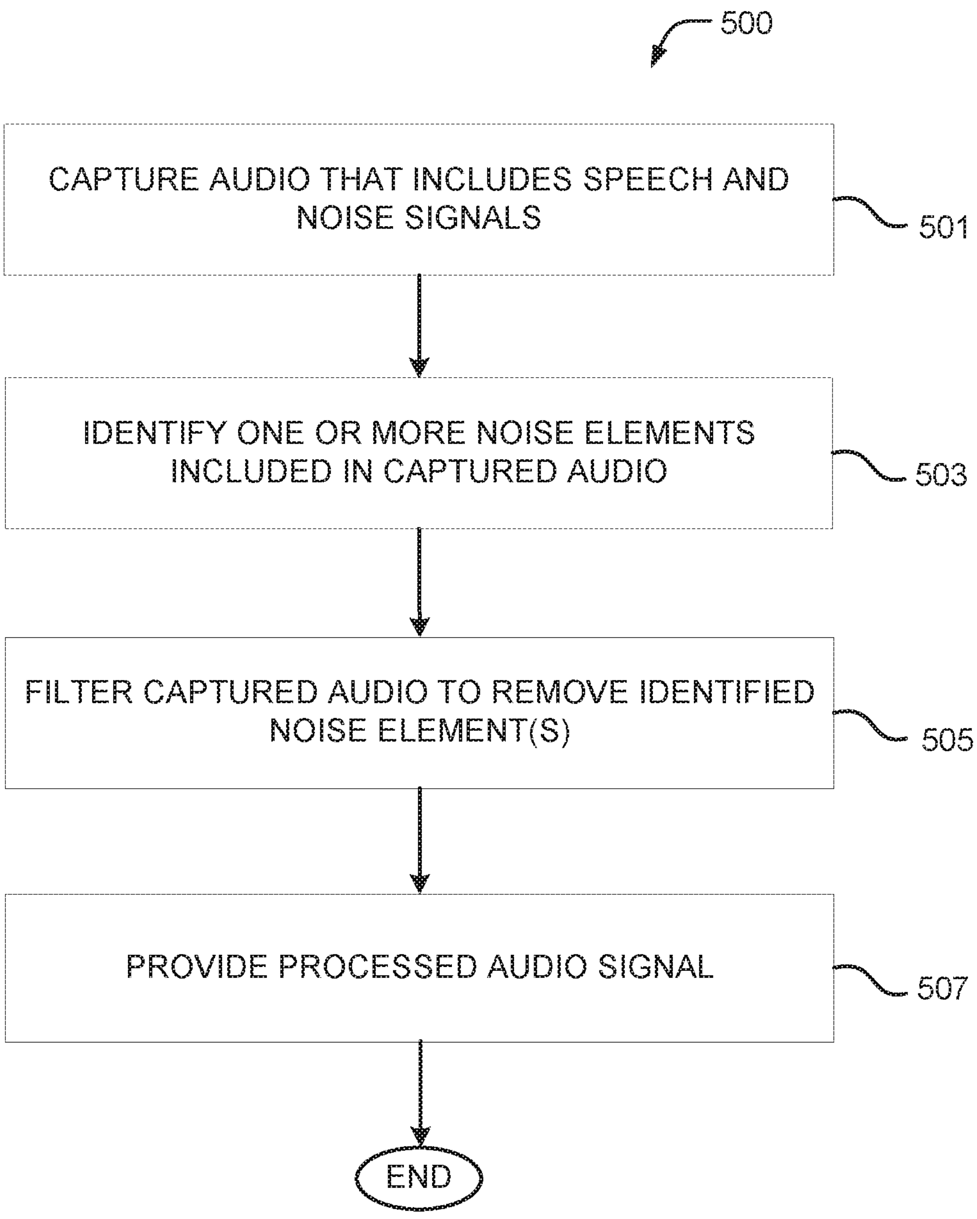
FIG. 5 is a flow diagram of method steps for generating a processed audio signal via the open active noise cancellation system of FIG. 1, according to various embodiments of the present disclosure.

FIG. 5 is a flow diagram of method steps for generating a processed audio signal via the open active noise cancellation system of FIG. 1, according to various embodiments of the present disclosure. Although the method steps are described with respect to the systems of FIGS. 1-4, persons skilled in the art will understand that any system configured to perform the method steps, in any order, falls within the scope of the various embodiments. In some embodiments, open active noise cancellation system 200 may continually execute method 500 on captured audio in real-time.

As shown, method 500 begins at step 501, where open active noise cancellation system 110 captures audio that includes speech and noise signals. In various embodiments, one or more components (e.g., one or more sensors 112, audio input device 114) included in input stack 330 acquire signals from sources in an ambient environment. For example, input stack 330 could acquire speech signal 322 generated by user 320 and noise signal 312 generated by one or more noise sources 310. Processor 118 receives the signals acquired from input stack 330 as captured audio signal 332.

At step 503, open active noise cancellation system 110 identifies one or more noise elements included in the captured audio signal. Upon receiving captured audio signal 332, processor 118 executes speech processing application 218 in order to identify one or more noise elements that may be included in captured audio signal 332. In various embodiments, neural network 342 may employ various applications (e.g., voice recognition application 344, noise recognition application 346, or other ML techniques) to identify noise elements and/or extraneous speech elements that are included in portions of captured audio signal 332.

At step 505, open active noise cancellation system 110 filters captured audio to remove identified noise elements from the captured audio signal. Speech processing application 218 generates processed audio signal 352 by applying filter 348 to attenuate and/or remove noise elements from captured audio signal 332 that were identified by neural network 342. In some embodiments, filter 348 may decompose captured audio signal 332 into a set of filtered signals, where each filtered signal corresponds to one or more frequency sub-bands of captured audio signal 332. In such instances, filter 348 may attenuate one or more of the frequency sub-bands in order to attenuate identified noise elements and/or speech elements of captured audio signal 352.

At step 507, open active noise cancellation system 110 provides a processed audio signal. Upon generating processed audio signal 352, processor 118 transmits processed audio signal 352 to one or more recipients. In some embodiments, processor 118 transmits processed audio to one or more user devices 132, communications servers 134, and/or other devices employing open active noise cancellation system 136 via network 120.

Figure 6:
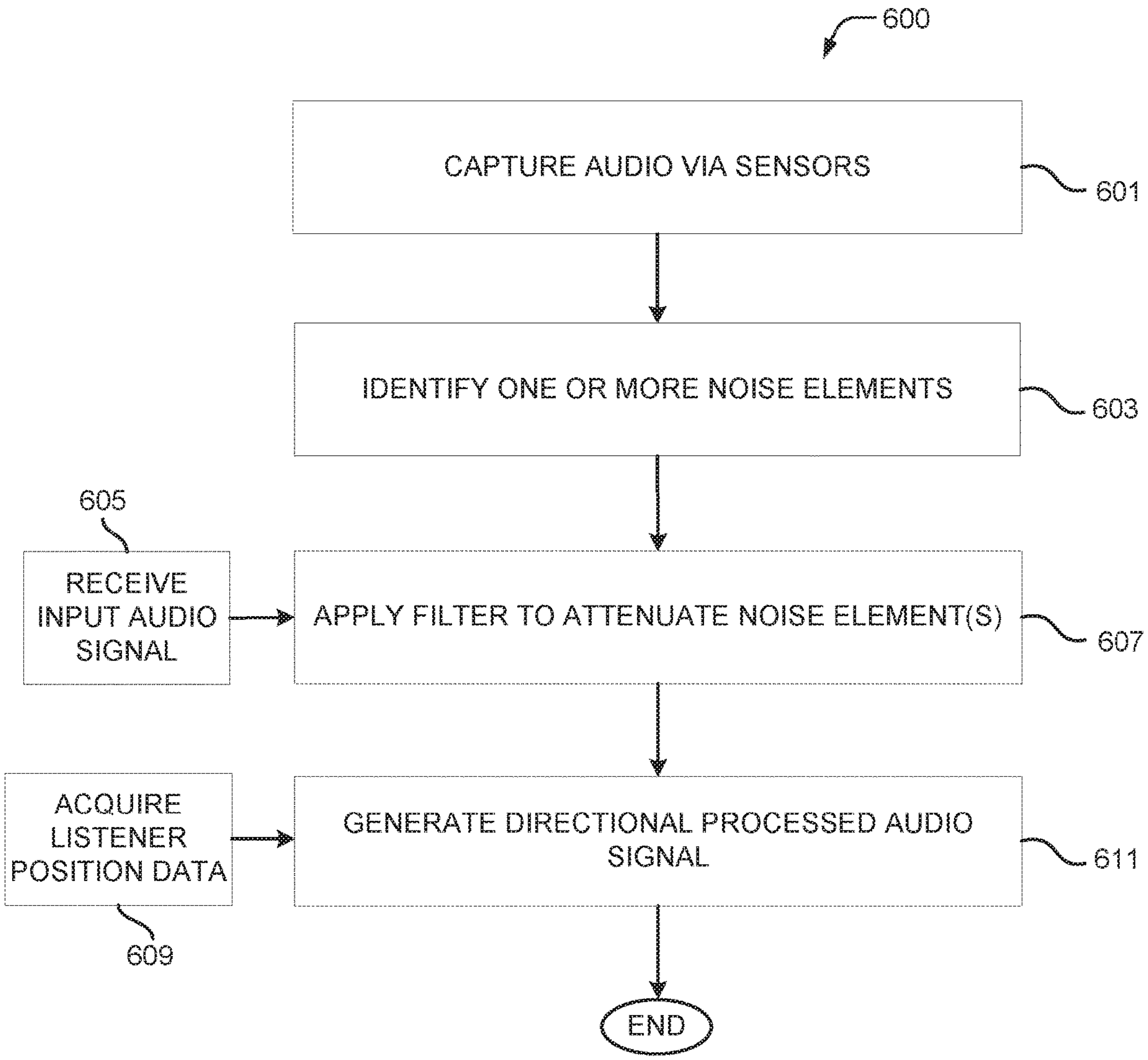
FIG. 6 is a flow diagram of method steps for generating a directional audio output signal via the open active noise cancellation system of FIG. 1, according to various embodiments of the present disclosure.

FIG. 6 is a flow diagram of method steps for generating a directional audio output signal via the open active noise cancellation system of FIG. 1, according to various embodiments of the present disclosure. Although the method steps are described with respect to the systems of FIGS. 1-4, persons skilled in the art will understand that any system configured to perform the method steps, in any order, falls within the scope of the various embodiments. In some embodiments, open active noise cancellation system 200 may continually execute method 600 on captured audio and a received audio input signal in real-time.

As shown, method 600 begins at step 601, where open active noise cancellation system 110 captures audio in an ambient environment using one or more sensors. For example, one or more sensors 112 could acquire sensor data corresponding to soundwaves received from one or more noise sources 410. The one or more sensors 112 could then generate noise signal 322 that corresponds to the received soundwaves. In various embodiments, the one or more sensors 112 send noise signal 422 to processor 118.

At step 603, open active noise cancellation system 110 identifies one or more noise elements. In some embodiments, neural network 342 included in speech processing application 218 may employ noise recognition application 346 in order to identify one or more noise elements included in noise signal 422. For example, neural network 342 could employ noise recognition application to retrieve one or more reference signals from noise database 430 that correspond to specific noise elements (e.g., a cough, one or more loudspeakers, one or more individuals speaking, HVAC systems, computer keyboard/mouse interactions, etc.). Upon retrieving the reference signal, neural network 342 can compare portions of noise signal 422 to the reference signals and identify portions of the noise signal 422 that match at least one reference signal.

At step 605, open active noise cancellation system 110 receives an input audio signal. Speech processing application 218 receives input audio signal 402 from a sender via network 120. Input audio signal 402 includes a speech signal that is from a sender device. In some embodiments, speech processing application 218 may separately acquire and/or analyze input audio signal 402 and noise signal 422.

At step 607, open active noise cancellation system 110 applies a filter to the noise signal in order to attenuate the one or more identified noise elements. In various embodiments, speech processing application 218 may employ filter 348 to attenuate one or more portions of noise signal 422. In some embodiments, speech processing application 218 may employ filter 348 to generate a new noise cancellation signal that is incorporated into directional processed signal 432. In such instances, when audio output device 116 emits a soundwave, the soundwave includes an anti-noise portion that provides destructive interference with the noise signal 422. Additionally or alternatively, speech processing application 218 may employ filter 348 to compensate for only portions of the noise signal 422 that were identified by neural network 342. In such instances, speech processing application only compensates for portions of the noise signal 422 that were identified as known noise elements. In such instances, user 420 is able to hear portions of the noise signal 422 that were not identified as noise elements.

At step 609, open active noise cancellation system 110 acquires position data corresponding to a listener. One or more sensors 112 acquire sensor data relating to the position (s) and/or orientation(s) of one or more users 420 within the ambient environment. The one or more sensors 112 generate position data 424 based on the acquired sensor data and transmits position data 424 to speech processing application 218.

At step 611, open active noise cancellation system 110 generates a directional processed audio signal based on the attenuated noise elements and the acquired position data. Speech processing application 218 analyzes position data 424 that specifies the position of user 420 and generates position parameters based on the position data 424. In various embodiments, the position parameters specify characteristics, including direction and distance, which are incorporated into directional processed audio signal 432. In such instances, directional processed audio signal 432 has characteristics that correspond to input audio signal 402, characteristics that compensate for noise signal 422, and/or characteristics that specify the direction and magnitude of soundwaves to be emitted.

Upon generating directional processed audio signal 432, speech processing application 218 transmits directional processed audio signal 432 to audio output device 116, which outputs directional processed audio signal 432 by emitting soundwaves that produce acoustic field 442. The characteristics of acoustic field 442 enable user 420 to hear portions of directional processed audio signal 432 that correspond to input audio signal 402, while attenuating noise signals 422 (e.g., by canceling out the noise signals via destructive interference) that are within the ambient environment.

In sum, an open active noise cancellation system includes a speech processor, sensors, and I/O devices. When a user is speaking, an input stack that includes at least one sensor and one I/O device captures audio that includes the user's speech signal and one or more noise signals from noise sources in the environment. The speech processor includes a neural network that processes the captured audio and implements speech recognition and/or noise recognition modules to identify portions of the captured audio. The neural network identifies one or more noise signals included in portions of the captured audio and causes a filter to remove and/or attenuate the identified noise signals. The speech processor then provides the processed audio signal to one or more devices that reproduce the processed audio signal.

When a user is listening to an input audio signal, the sensors included in the open active noise cancellation system generate position data related to the position of the user and one or more noise signals captured from noises sources in the environment. The speech processor receives the input audio signal, noise signal, and position data and processes the signal. The neural network uses the noise recognition module to identify one or more noise signals by comparing the received noise signal to one or more stored reference noise signals. The speech processor then generates a directional processed audio signal. The directional processed audio signal causes an output device to emit an acoustic field that encompasses the user. The directional processed audio signal also attenuates the noise signals within the environment, such as by destructively interfering with the noise signals. The directional processed audio signal is transmitted to the output device, which generates an acoustic field. The user hears the directional processed audio signal within the acoustic field, while noise signals included the environment are attenuated and/or suppressed within the acoustic field.

At least one advantage of the disclosed techniques is that audio signals can be transmitted to a user while also canceling certain noises within an open environment. The open active noise cancellation system identifies and then attenuates or cancels certain noise elements in the environment, which enables the user to both speak and/or listen to speech within an open environment without requiring extra mechanical equipment, such as barriers, to attenuate the noise elements.

1. In one or more embodiments, a method for reducing noise in an audio signal comprises determining, based on sensor data acquired from a first set of sensors, a first position of a user in an environment, acquiring, via the first set of sensors, one or more audio signals associated with sound in the environment, identifying one or more noise elements in the one or more audio signals, and generating a first directional audio signal based on the one or more noise elements, wherein, when the first directional audio signal is outputted by a first speaker, the first speaker produces a first acoustic field that attenuates the one or more noise elements at the first position.
2. The method of clause 1, where identifying the one or more noise elements comprises comparing the one or more audio signals to at least one reference signal, and when the one or more audio signals match the at least one reference signal, classifying the one or more audio signals based on the at least one reference signal.
3. The method of clause 1 or 2, where identifying the one or more noise elements comprises comparing, via a neural network, a first audio signal included in the one or more audio signals to a first reference signal associated with a first noise element, and based on determining that the first audio signal matches the first reference signal, classifying the first audio signal as including the first noise element.
4. The method of any of clauses 1-3, further comprising comparing a first audio signal included in the one or more audio signals to a first set of reference signals, and determining that the first audio signal does not match at least one reference signal included in the first set of reference signals, and storing data associated with the first audio signal as an additional reference signal included in the first set of reference signals.
5. The method of any of clauses 1-4, where identifying the one or more noise elements comprises comparing the one or more audio signals to each reference signal included in a first set of reference signals, and when the one or more audio signals match at least one reference signal included in the first set of reference signals, classifying the one or more audio signals as the one or more noise elements, and when the one or more audio signals do not match at least one reference signal included in the first set of reference signals, determining that the one or more audio signals will not be classified as the one or more noise elements.
6. The method of any of clauses 1-5, further comprising determining, based on sensor data acquired from the first set of sensors, a second position of a user in an environment, and generating a second directional audio signal based on the one or more noise elements, wherein, when the second directional audio signal is outputted by the first speaker, the first speaker produces a second acoustic field that attenuates the one or more noise elements at the second position.
7. The method of any of clauses 1-6, further comprising determining a second position of the first speaker, wherein the first directional audio signal is based on the first position and the second position.
8. The method of any of clauses 1-7, further comprising receiving, from a second device via a first network, an input audio signal, wherein the first directional audio signal includes at least a portion of the input audio signal.
9. The method of any of clauses 1-8, further comprising generating a first set of directional audio signals based on the one or more noise elements, wherein, when the first set of directional audio signals is outputted by a first plurality of speakers, the first plurality of speakers produce the first acoustic field.
10. In one or more embodiments, an audio system comprises a first set of sensors that produces sensor data associated with a first position of a user in an environment, and produces one or more audio signals associated with sound acquired from the environment, a first speaker, and a processor coupled to the first set of sensors and the first speaker that determines, based on the sensor data, the first position of the user, receives, from the first set of sensors, the one or more audio signals, identifies one or more noise elements in the one or more audio signals, and generates, a first directional audio signal based on the one or more noise elements, wherein the first speaker outputs the first directional audio signal to produce a first acoustic field that attenuates the one or more noise elements at the first position.
11. The audio system of clause 10, further comprising a first database that stores a first set of reference signals associated with the one or more noise elements.
12. The audio system of clause 10 or 11, where the processor further compares the one or more audio signals to a first set of reference signals, when the one or more audio signals match at least one reference signal included in the first set of reference signals, classifies the one or more audio signals as the one or more noise elements, and when the one or more audio signals do not match at least one reference signal included in the first set of reference signals, determines that the one or more audio signals will not be classified as the one or more noise elements.
13. The audio system of any of clauses 10-12, where the first set of sensors comprises at least one camera that acquires position data associated with the first position, and at least one microphone that acquires the one or more audio signals.
14. The audio system of any of clauses 10-12, where the first speaker comprises a parametric speaker.

15. The audio system of any of clauses 10-14, where the first speaker is included in a plurality of parametric speakers of the audio system, the processor further generates a first set of directional audio signals based on the one or more noise elements, and each parametric speaker included in the plurality of parametric speakers outputs at least one directional audio signal in the first set of directional audio signals to produce the first acoustic field.
16. The audio system of any of clauses 10-15, where the first set of sensors further produces sensor data associated with a second position of the user, the processor further determines, based on the sensor data, the second position of the user, and generates a second directional audio signal based on the one or more noise elements, and the first speaker outputs the second directional audio signal to produce a second acoustic field that attenuates the one or more noise elements at the second position.
17. In one or more embodiments, one or more non-transitory computer-readable media comprise instructions that, when executed by one or more processors, cause the one or more processors to perform the steps of determining a first position of a user in an environment, acquiring, via a first set of sensors, one or more audio signals associated with sound in the environment, identifying one or more noise elements in the one or more audio signals by comparing the one or more audio signals to each reference signal included in a first set of reference signals, and when the one or more audio signals match at least one reference signal included in the first set of reference signals, classifying the one or more audio signals as the one or more noise elements, and generating a first directional audio signal based on the one or more noise elements, wherein, when the first directional audio signal is outputted by a first speaker, the first speaker produces a first acoustic field that attenuates the one or more noise elements at the first position.
18. The one or more non-transitory computer-readable media of clause 17, where generating a first directional audio signal comprises receiving a input audio signal, generating an anti-noise signal that matches an amplitude for the at least one reference signal and is anti-phase to the at least one reference signal, and combining the input audio signal with the anti-noise signal to generate the first directional audio signal.
19. The one or more non-transitory computer-readable media of clause 17 or 18, further comprising instructions that, when executed by the one or more processors, cause the one or more processors to perform the steps of storing the anti-noise signal, and associating the anti-noise signal with the at least one reference signal.
20. The one or more non-transitory computer-readable media of any of clauses 17-19, further comprising instructions that, when executed by the one or more processors, cause the one or more processors to perform the step of, upon determining that the one or more audio signals will not be classified as the one or more noise elements, storing data associated with the one or more audio signals as an additional reference signal included in the first set of reference signals.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for reducing noise in an audio signal, the method comprising:

determining, based on sensor data acquired from a first set of sensors, a first position of a user in an environment;

acquiring, via the first set of sensors, one or more audio signals associated with sound in the environment;

identifying one or more noise elements in the one or more audio signals;

identifying one or more individual speakers in the one or more audio signals by comparing, via a neural network, the one or more audio signals with learned speech elements and speaker characteristics;

decomposing the one or more audio signals into one or more filtered signals, wherein each filtered signal corresponds to one or more frequency sub-bands of the one or more audio signals; and generating, based on the one or more filtered signals, a first directional audio signal wherein, when the first directional audio signal is outputted by a first loudspeaker, the first loudspeaker produces, based on the first directional audio signal, a first acoustic field that attenuates the one or more frequency sub-bands associated with the one or more noise elements at the first position and emphasizes one or more frequency sub-bands associated with the one or more individual speakers.

2. The method of claim 1, wherein identifying the one or more noise elements comprises:

comparing the one or more audio signals to at least one reference signal; and when the one or more audio signals match the at least one reference signal, classifying the one or more audio signals based on the at least one reference signal.

3. The method of claim 1, wherein identifying the one or more noise elements comprises:

comparing, via the neural network, a first audio signal included in the one or more audio signals to a first reference signal associated with a first noise element; and based on determining that the first audio signal matches the first reference signal, classifying the first audio signal as including the first noise element.

4. The method of claim 1, further comprising:

comparing a first audio signal included in the one or more audio signals to a first set of reference signals;

determining that the first audio signal does not match at least one reference signal included in the first set of reference signals; and storing data associated with the first audio signal as an additional reference signal included in the first set of reference signals.

5. The method of claim 1, where identifying the one or more noise elements comprises:

comparing the one or more audio signals to each reference signal included in a first set of reference signals; and when the one or more audio signals match at least one reference signal included in the first set of reference signals, classifying the one or more audio signals as the one or more noise elements; and when the one or more audio signals do not match at least one reference signal included in the first set of reference signals, determining that the one or more audio signals will not be classified as the one or more noise elements.

6. The method of claim 1, further comprising:

determining, based on sensor data acquired from the first set of sensors, a second position of the user in an environment; and generating a second directional audio signal based on the one or more noise elements, wherein, when the second directional audio signal is outputted by the first loudspeaker, the first loudspeaker produces a second acoustic field that attenuates the one or more noise elements at the second position.

7. The method of claim 1, further comprising determining a second position of the first loudspeaker, wherein the first directional audio signal is based on the first position and the second position.

8. The method of claim 1, further comprising receiving, from a second device via a first network, an input audio signal, wherein the first directional audio signal includes at least a portion of the input audio signal.

9. The method of claim 1, further comprising generating a first set of directional audio signals based on the one or more noise elements, wherein, when the first set of directional audio signals is outputted by a first plurality of loudspeakers, the first plurality of loudspeakers produce the first acoustic field.

10. An audio system, comprising:

a first set of sensors that:

produces sensor data associated with a first position of a user in an environment, and produces one or more audio signals associated with sound acquired from the environment;

a first loudspeaker; and a processor coupled to the first set of sensors and the first loudspeaker that:

determines, based on the sensor data, the first position of the user, receives, from the first set of sensors, the one or more audio signals, identifies one or more noise elements in the one or more audio signals, identifies one or more individual speakers in the one or more audio signals by comparing, via a neural network, the one or more audio signals with learned speech elements and speaker characteristics, decomposes the one or more audio signals into one or more filtered signals, wherein each filtered signal corresponds to one or more frequency sub-bands of the one or more audio signals, and generates, based on the one or more filtered signals, a first directional audio signal wherein the first loudspeaker outputs the first directional audio signal to produce, based on the first directional audio signal, a first acoustic field that attenuates the one or more frequency sub-bands associated with the one or more noise elements at the first position and emphasizes one or more frequency sub-bands associated with the one or more individual speakers.

11. The audio system of claim 10, further comprising a first database that stores a first set of reference signals associated with the one or more noise elements.

12. The audio system of claim 11, wherein the processor further:

compares the one or more audio signals to a first set of reference signals;

when the one or more audio signals match at least one reference signal included in the first set of reference signals, classifies the one or more audio signals as the one or more noise elements; and when the one or more audio signals do not match at least one reference signal included in the first set of reference signals, determines that the one or more audio signals will not be classified as the one or more noise elements.

13. The audio system of claim 10, wherein the first set of sensors comprises:

at least one camera that acquires position data associated with the first position; and at least one microphone that acquires the one or more audio signals.

14. The audio system of claim 10, wherein the first loudspeaker comprises a parametric loudspeaker.

15. The audio system of claim 10, wherein:

the first loudspeaker is included in a plurality of parametric loudspeakers of the audio system;

the processor further generates a first set of directional audio signals based on the one or more noise elements; and each parametric loudspeaker included in the plurality of parametric loudspeakers outputs at least one directional audio signal in the first set of directional audio signals to produce the first acoustic field.

16. The audio system of claim 10, wherein:

the first set of sensors further produces sensor data associated with a second position of the user;

the processor further:

determines, based on the sensor data, the second position of the user, and generates a second directional audio signal based on the one or more noise elements; and the first loudspeaker outputs the second directional audio signal to produce a second acoustic field that attenuates the one or more noise elements at the second position.

17. One or more non-transitory computer-readable media comprising instructions that, when executed by one or more processors, cause the one or more processors to perform the steps of:

determining a first position of a user in an environment;

acquiring, via a first set of sensors, one or more audio signals associated with sound in the environment;

identifying one or more noise elements in the one or more audio signals by:

comparing the one or more audio signals to each reference signal included in a first set of reference signals, and when the one or more audio signals match at least one reference signal included in the first set of reference signals, classifying the one or more audio signals as the one or more noise elements;

identifying one or more individual speakers in the one or more audio signals by comparing, via a neural network, the one or more audio signals with learned speech elements and speaker characteristics;

decomposing the one or more audio signals into one or more filtered signals, wherein each filtered signal corresponds to one or more frequency sub-bands of the one or more audio signals; and generating, based on the one or more filtered signals, a first directional audio signal wherein, when the first directional audio signal is outputted by a first loudspeaker, the first loudspeaker produces, based on the first directional audio signal, a first acoustic field that attenuates the one or more frequency sub-bands associated with the one or more noise elements at the first position and emphasizes one or more frequency sub-bands associated with the one or more individual speakers.

18. The one or more non-transitory computer-readable media of claim 17 further comprising instructions that, when executed by the one or more processors, cause the one or more processors to perform the steps of:

generating a noise cancellation signal based on the one or more noise elements by generating an anti-noise signal that matches an amplitude for the at least one reference signal and is antiphase to the at least one reference signal.

19. The one or more non-transitory computer-readable media of claim 18, further comprising instructions that, when executed by the one or more processors, cause the one or more processors to perform the steps of:

storing the anti-noise signal; and associating the anti-noise signal with the at least one reference signal.

20. The one or more non-transitory computer-readable media of claim 17, further comprising instructions that, when executed by the one or more processors, cause the one or more processors to perform the step of, upon determining that the one or more audio signals will not be classified as the one or more noise elements, storing data associated with the one or more audio signals as an additional reference signal included in the first set of reference signals.

* * * * *